(12) United States Patent
Høyland et al.

(10) Patent No.: US 11,863,026 B2
(45) Date of Patent: Jan. 2, 2024

(54) ELECTRIC MACHINE ROTOR SLEEVE

(71) Applicant: ROLLS-ROYCE ELECTRICAL NORWAY AS, Trøndelag (NO)

(72) Inventors: Jørg Høyland, Trondheim (NO); Fredrik Widerøe, Trondheim (NO)

(73) Assignee: ROLLS-ROYCE ELECTRICAL NORWAY AS, Trondheim (NO)

( * ) Notice: Subject to any disclaimer, the term of this patent is extended or adjusted under 35 U.S.C. 154(b) by 50 days.

(21) Appl. No.: 17/670,857

(22) Filed: Feb. 14, 2022

(65) Prior Publication Data
US 2022/0271588 A1 Aug. 25, 2022

(30) Foreign Application Priority Data

Feb. 24, 2021 (GB) .................................. 2102581

(51) Int. Cl.
*H02K 1/27* (2022.01)
*H02K 1/28* (2006.01)
*B64D 27/24* (2006.01)
*H02K 1/278* (2022.01)
*H02K 15/03* (2006.01)
*H02K 21/14* (2006.01)

(52) U.S. Cl.
CPC .............. *H02K 1/28* (2013.01); *B64D 27/24* (2013.01); *H02K 1/278* (2013.01); *H02K 15/03* (2013.01); *H02K 21/14* (2013.01)

(58) Field of Classification Search
CPC .......... H02K 1/28; H02K 1/278; H02K 15/03; H02K 21/14; H02K 1/2706; H02K 1/274; H02K 2213/03; B64D 27/24; B64D 2027/026
See application file for complete search history.

(56) References Cited

U.S. PATENT DOCUMENTS

| 5,122,704 A * | 6/1992 | Blakeley | H02K 3/46 310/43 |
| 5,485,045 A * | 1/1996 | Canders | H02K 15/03 310/156.31 |
| 2004/0021396 A1 | 2/2004 | Ehrhart et al. | |
| 2012/0313461 A1 | 12/2012 | Takeuchi | |

(Continued)

FOREIGN PATENT DOCUMENTS

| CN | 204906030 U | 12/2015 |
| EP | 1369976 A1 | 12/2003 |

(Continued)

OTHER PUBLICATIONS

Aug. 1, 2022 Search Report issued in European Patent Application No. 22157653.1.

(Continued)

*Primary Examiner* — Thomas Truong
(74) *Attorney, Agent, or Firm* — Oliff PLC (57) ABSTRACT

A rotor sleeve (46) for a rotor (29) of an electric machine (28), the rotor sleeve (46) comprising:
an inner layer (52) of wound filaments (56) comprising a first material having a first modulus of elasticity; and
an outer layer (54) of wound filaments (60) wound around the inner layer (52),
the outer layer (54) comprising a second material having a second modulus of elasticity higher than the first modulus.

16 Claims, 7 Drawing Sheets

(56) References Cited

U.S. PATENT DOCUMENTS

| | | | |
|---|---|---|---|
| 2015/0188369 A1* | 7/2015 | Arimatsu | H02K 1/278 |
| | | | 310/156.28 |
| 2015/0330231 A1 | 11/2015 | Mcguire et al. | |
| 2017/0373548 A1* | 12/2017 | Arimatsu | H02K 1/2781 |
| 2019/0199151 A1* | 6/2019 | Loder | H02K 1/02 |
| 2022/0190660 A1* | 6/2022 | Flower | H02K 15/03 |
| 2022/0271601 A1 | 8/2022 | Høyland | |
| 2022/0278584 A1 | 9/2022 | Høyland | |

FOREIGN PATENT DOCUMENTS

| | | | |
|---|---|---|---|
| GB | 2250642 A | 6/1992 | |
| JP | H09-19093 A | 1/1997 | |
| JP | 2017-163752 A | 9/2017 | |
| JP | 2018-082564 A | 5/2018 | |
| WO | 2013/160739 A2 | 10/2013 | |
| WO | 2020188006 A1 | 9/2020 | |

OTHER PUBLICATIONS

Aug. 1, 2022 Search Report issued in European Patent Application No. 22157656.4.
Aug. 1, 2022 Search Report issued in European Patent Application No. 22157654.9.
Jun. 21, 2021 Search Report issued in British Patent Application No. 2102581.2.
Jun. 21, 2021 Search Report issued in British Patent Application No. 2102582.0.
Jun. 23, 2021 Search Report issued in British Patent Application No. 2102583.8.
Aug. 2, 2023 Office Action Issued In U.S. Appl. No. 17/670,880.

\* cited by examiner

ELECTRIC MACHINE ROTOR SLEEVE

The present disclosure concerns a rotor sleeve for an electric machine. The present disclosure also relates to a machine having the rotor sleeve, and a hybrid electric propulsion system and aircraft having the electric machine.

Permanent magnet machines are known, in which a rotor comprising one or more permanent magnet is provided to rotate relative to a stator comprising electric windings.

Typically, the rotor comprises a radially inner rotor core/shaft to which the magnets are bonded. Securely affixing the permanent magnets to the inner core is difficult in view of the incompatible materials typically used, and the high centrifugal forces which act to drive the magnets radially outwards. Such centrifugal forces may be particularly high in the case of high-power electric machines in view of the large rotor diameters and higher rotational speeds encountered by such machines.

This problem is particularly acute for electric machines used on aircraft. Such machines must have a high power density, and so must rotate at high speeds. Additionally, the release of one or more permanent magnets may represent a serious safety issue due to the high velocity debris, in addition to the safety issues inherent in failure of the machine itself.

Conventionally, such machines comprise a rotor sleeve (also known as a rotor "banding") which surrounds the rotor to contain the permanent magnets. This banding must be located in the air-gap between the rotor and stator. Consequently, where such a banding is installed, the distance between the rotor and stator is increased, leading to reduced machine power density. Consequently, it is desirable to reduce the thickness of this rotor banding. Further problems with prior art banding systems may also be encountered, such as cost, difficulty of installation, weight and strength.

According to a first aspect there is provided a rotor sleeve for a rotor of an electric machine, the rotor sleeve comprising:
  an inner layer of wound filaments comprising a first material having a first modulus of elasticity; and
  an outer layer of wound filaments wound around the inner layer, the outer layer comprising a second material having a second modulus of elasticity higher than the first modulus.

It has been found that, by providing an inner layer of wound filaments having a low modulus of elasticity, a strong rotor sleeve can be provided, which is resistant to centrifugal forces in use, thereby providing effective containment of the rotor.

The inner and/or outer layer of wound filaments may comprise pre-stressed filaments.

The outer layer of wound filaments may be pre-stressed to a stress of greater than 1000 MPa, and may be stressed to a stress of between 500 and 1500 MPA.

The inner and/or outer layer of wound filaments may be provided within a matrix material such as epoxy, cyanate ester or phenolic resin.

The inner layer of wound filaments may comprise any of glass fibre (e.g. E-glass or S-glass), aramid, PBO, nylon, or Dyneema, or a mixture of one of more of these materials.

The inner layer may comprise interwoven ply angles of between ±30° and ±60°, and preferably approximately ±45° relative to a rotational axis of the electric machine rotor when installed.

The inner layer may have a radial thickness of between 0.1 and 1 mm, and may have a radial thickness of approximately 0.5 mm.

The outer layer may comprise carbon or ceramic fibre.

The outer layer may comprise ply angles of approximately 90° relative to a rotational axis of the electric machine rotor when installed.

According to a second aspect there is provided a method of manufacturing a sleeved rotor of an electric machine, the method comprising:
  providing a rotor;
  providing a sleeve comprising a first layer of wound filaments comprising a first material having a first modulus of elasticity, and a second layer of wound filaments wound around an outer diameter of the first layer and comprising a second material having a second modulus of elasticity higher than the first modulus; and
  sliding the sleeve over an outer diameter of the rotor.

The rotor may comprise one or more permanent magnets, and the sleeve may be slide over the outer diameter over the one or more permanent magnets.

The method may comprise, in a first step, winding the inner and outer layers of filaments around a mandrel, followed by curing of the filaments to form a composite ring.

The method may comprise, in a second step subsequent to the first step, urging the cured ring over a conical stressing device to increase an inner diameter of the ring and produce a pre-stress on the ring, and sliding the sleeve over the outer diameter of the rotor.

According to a third aspect there is provided an electric machine comprising a rotor fitted with a sleeve according to the first aspect.

The electric machine may be configured to operate as one or both of a generator and a motor.

The electric machine may comprise a permanent magnet electric machine comprising one or more surface permanent magnets provided at an outer diameter of the rotor.

According to a fourth aspect there is provided an aircraft propulsion system comprising an electric machine according to the third aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
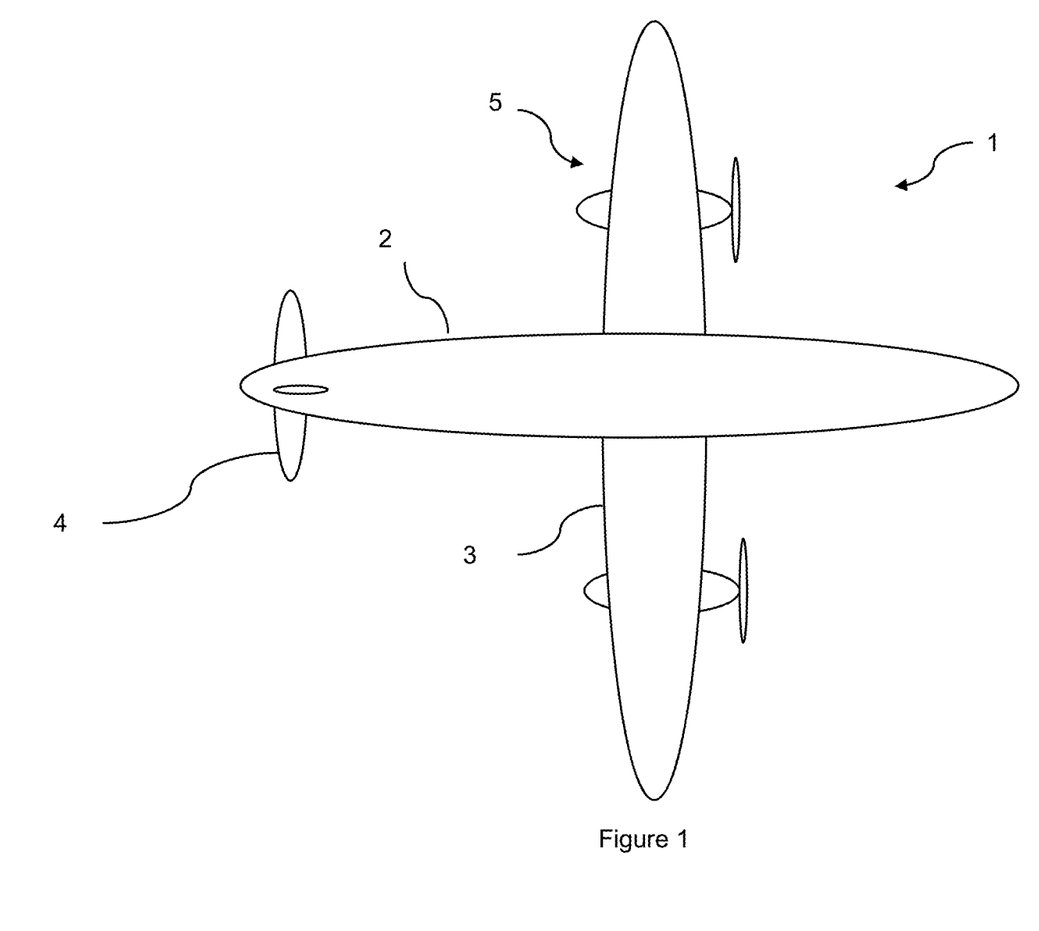
FIG. 1 is a plan view of a first aircraft comprising a parallel hybrid propulsion system.

With reference to FIG. 1, an aircraft 1 is shown. The aircraft is of conventional configuration, having a fuselage 2, wings 3, tail 4 and a pair of propulsion systems 5. One of the propulsion systems 5 is shown in figure detail in FIG. 2.

Figure 2:
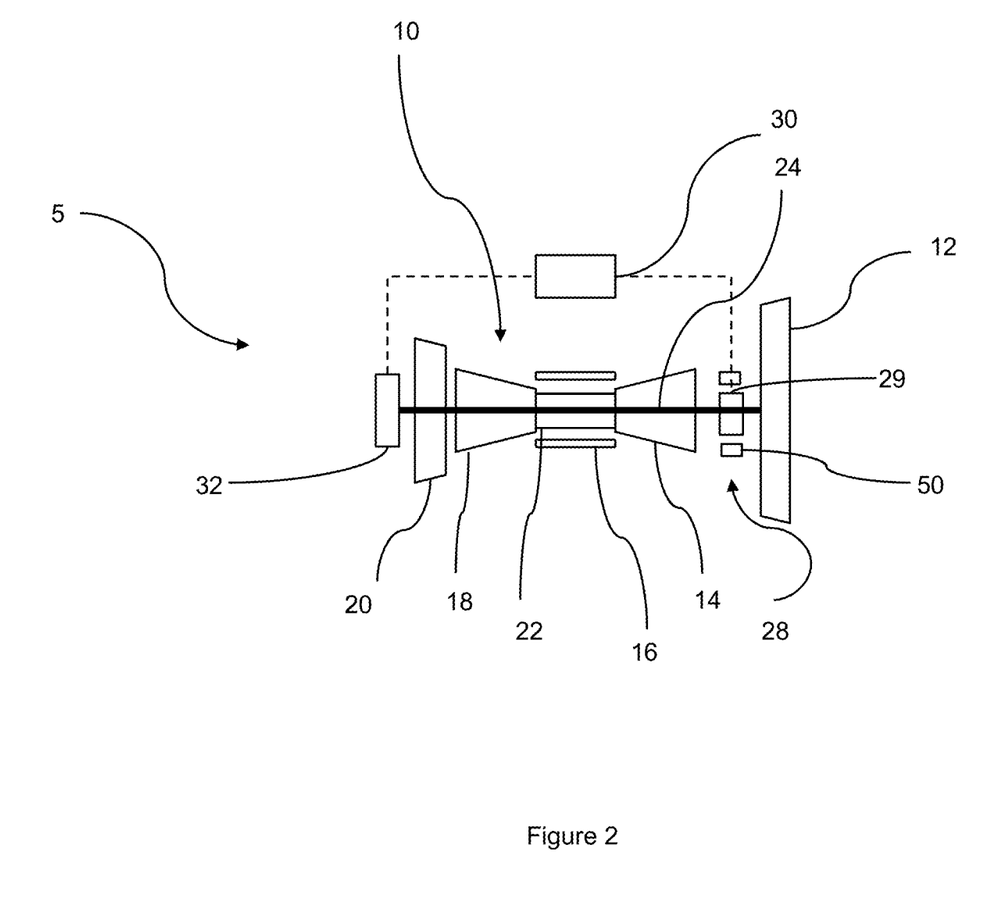
FIG. 2 is a schematic diagram of a parallel hybrid propulsion system for the aircraft of FIG. 1.

FIG. 2 shows the propulsion system 5 schematically. The propulsion system 5 includes an internal combustion engine in the form of a gas turbine engine 10. The gas turbine engine 10 comprises, in axial flow series, a propulsor in the form of a fan/propeller 12, a compressor 14, combustion equipment 16 and high and low-pressure turbines 18, 20.

The gas turbine engine 10 works in the conventional manner so that air is accelerated by the fan 12 to produce two air flows: a first core air flow into the compressor 14 and a second air flow which bypasses the compressor 14 to provide propulsive thrust. The core air flows through the compressor 14 where it is compressed, before delivering that air to the combustion equipment 16, where it is mixed with fuel and the mixture combusted. The resultant hot combustion products then expand through, and thereby drive the turbines 18, 20 before being exhausted through a nozzle to provide additional propulsive thrust. The high 18 and low-pressure turbines 18, 20 drive respectively the compressor 14 and fan 12, each by suitable interconnecting shaft 22, 24.

Other gas turbine engines to which the present disclosure may be applied may have alternative configurations. By way of example such engines may have an alternative number of interconnecting shafts (e.g. three) and/or an alternative number of compressors and/or turbines. Further, the engine may comprise a gearbox provided in the drive train from a turbine to a compressor and/or fan.

The propulsion system 5 further comprises one or more electrical machines. In particular, the system 5 comprises an electric motor 28. The motor 28 is of a conventional type, such as a permanent magnet electric machine, and is configured to drive a propulsor such as the fan 12. In the present embodiment, the motor 28 is coupled to the fan 12 via the low-pressure shaft 24. In this embodiment, the electric motor 28 is of a "core shaft mounted" type, in which a rotor 29 of the motor 28 is mounted directly to a surface of the low-pressure shaft 24, and is surrounded by a stator 50, provided radially outwardly of the rotor 29. The stator comprises electrical windings (not shown), which can be energised to produce a rotating magnetic field. This rotating magnetic field interacts with a magnetic field of the rotor 29, to cause rotation when acting as a motor. Consequently, the fan 12 may be powered by either or both of the gas turbine engine 10 via the low-pressure turbine 20, and the motor 28.

The electric motor 28 is coupled to an energy storage device 30 in the form of one or more of a chemical battery, fuel cell, and capacitor, which provides the electric motor 28 with electrical power during operation. In some cases, multiple energy storage systems, which may be of different types (chemical battery, fuel cell etc) may be provided for each propulsion system 5. In other cases, a common energy storage device 30 may be provided for multiple propulsion systems.

The propulsion system optionally comprises one or more further electric machines such as a generator 32, which is coupled to one or both of the motor 28 and the energy storage device 30, such that additional electrical energy can be provided in operation. The generator 32 is typically driven by the low-pressure shaft 24 of the gas turbine engine 10. The generator 32 may be coupled to the shaft 24 via a gearbox and/or clutch to allow for selectively connecting and disconnecting the generator 32 from the shaft 24. In some cases, the motor 28 may act as a generator.

Figure 3:
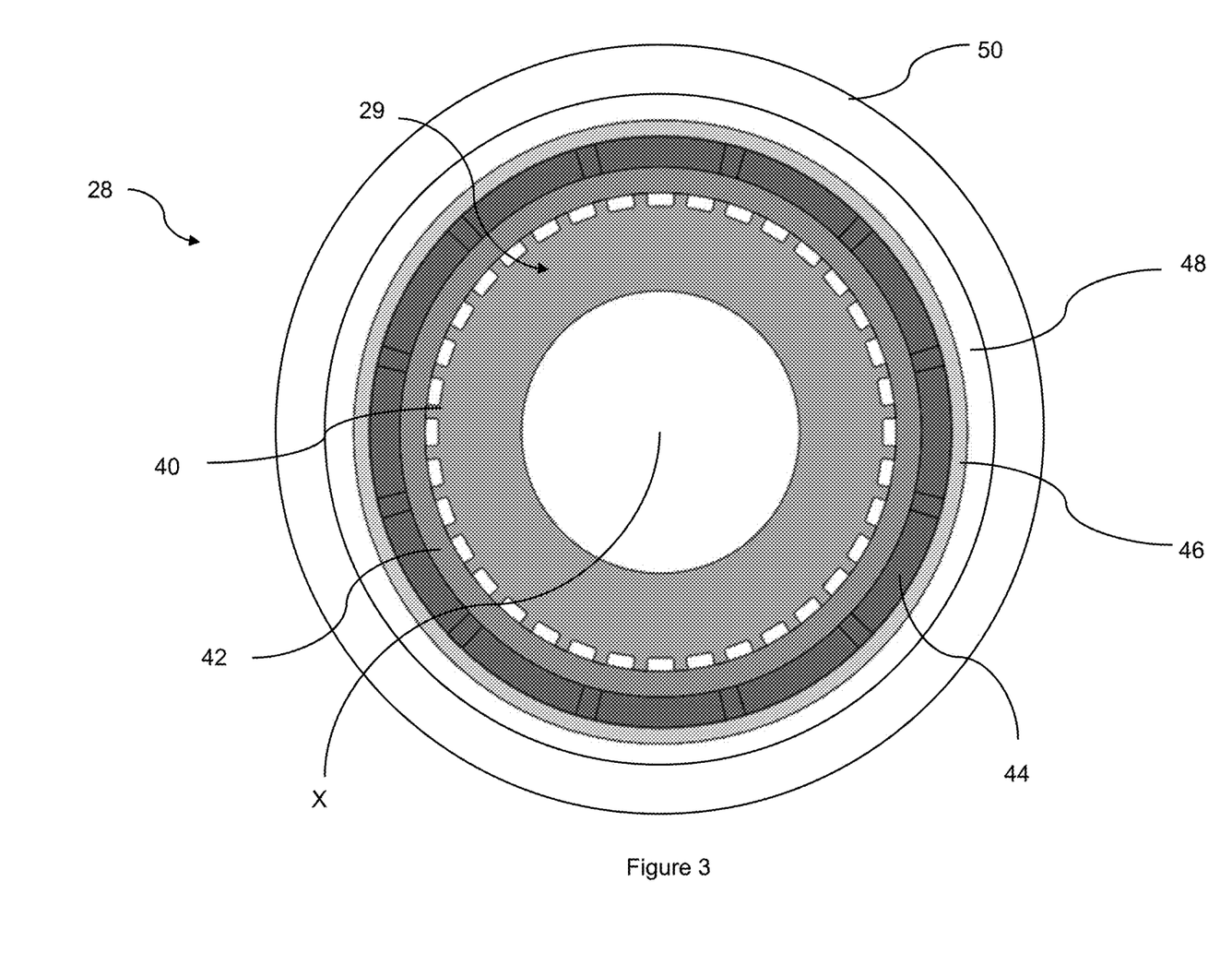
FIG. 3 is a schematic cross-sectional view of an electric machine suitable for the propulsion system of FIG. 2.

Details of the electric motor 28 are shown in FIG. 3. As will be appreciated, the generator 32 is broadly similar to the motor 28.

The motor 28 comprises a rotor 29 and a stator 50.

The rotor 29 comprises a shaft 40 which defines a rotational axis X. The shaft 40 is typically constructed from a structural material such as steel, aluminium or titanium, and is configured to be rotated by the motor 28 in use, and is coupled to the propulsor 12.

Radially outward of the shaft is a plurality of steel laminations 42. The steel laminations are typically thin, to minimise eddy currents, to thereby reduce losses and heat generation.

Radially outward of the laminations 42 is a plurality of permanent magnets 44. The permanent magnets 44 are provided on a circumferential outer surface of the laminations 42, and so the rotor can be said to be of the "surface permanent magnet" type. The permanent magnets 44 are typically adhered to the steel laminations by an adhesive.

In order to maintain the rotor in position in use, in opposition to centrifugal loads on the rotor, the rotor further comprises a rotor sleeve 46 which is provided radially outward of and at least partly surrounding the permanent magnets 44. The rotor sleeve 46 is described in further detail below, and is shown in more detail in FIGS. 4 and 5.

Radially outward of the sleeve 46 is an air gap 48, which allows for relative rotation between the rotor and stator 50. The stator 50 is provided radially outward of the air-gap 48 and comprises a plurality of stator coils (not shown), which, when energised, drive the rotor by interaction between the magnetic fields of the stator coils and the permanent magnets 44.

Figure 4:
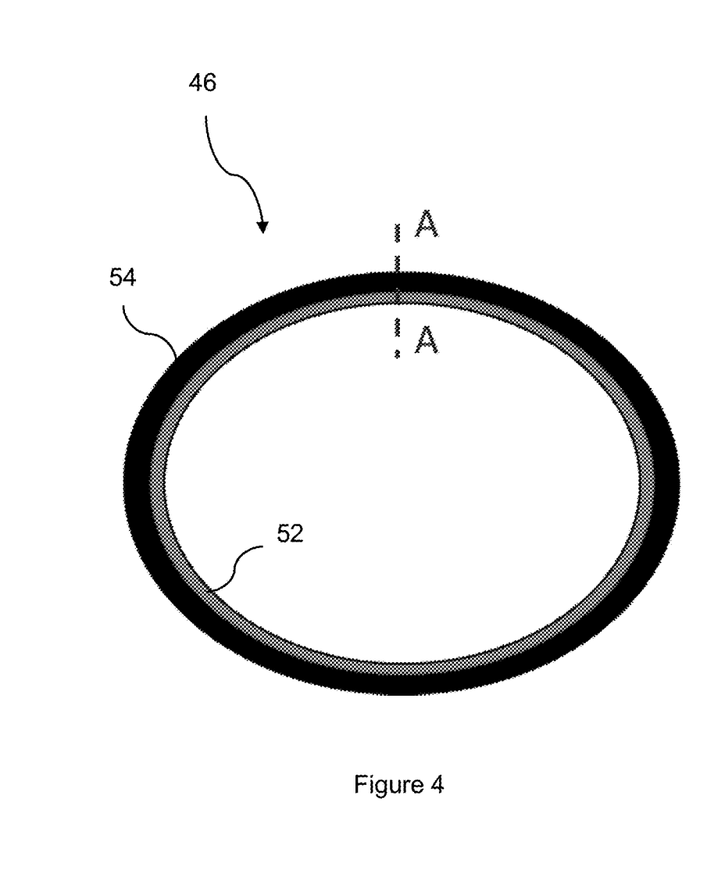
FIG. 4 is a cross-sectional view of a rotor sleeve of the electric machine of FIG. 3.

Referring now to FIG. 4, the rotor sleeve 46 is shown in more detail. The sleeve comprises an inner layer 52 and outer layer 54 which comprise different materials.

The inner layer 52 comprises a composite material comprising filaments 56 of a first material having a relatively low modulus of elasticity. That is to say, the first material is relatively elastic, and can deform to a relatively large degree when a tensile force is applied. The material of the first filaments must also be relatively flexible, to allow it to be wound into shape. Examples of suitable materials include glass fibres (e.g. E-glass or S-glass), aramid, Polybenzoxazole (PBO), nylon, or Dynema, or a mixture of one of more of these materials. In one example, in the case of glass fibres, the fibres have a stiffness modulus of approximately 90 Giga-Pascals GPa.

The fibres 56 of the inner layer 52 are embedded within a matrix material such a resin such as phenolic, epoxy, cyanate ester resin or PEEK 58. Together, the fibres 56 and resin 58 form a composite material. The matrix material in which the fibres are situated have an elastic modulus of approximately 8 GPa. For a volume fraction of 50%, this gives an overall elastic modulus of the low elastic modulus filament layer of approximately 50 GPa.

Similarly, the outer layer 54 comprises a composite material comprising filaments 60 in a matrix material 62. However, the filaments 60 are of a second material having a relatively high modulus of elasticity, i.e. higher than the modulus of elasticity than the first material. In this embodiment, the filaments 60 comprise carbon fibre, though other fibre materials may be suitable. The matrix material 62 may be the same as the matrix material 58 of the inner layer 52, or may be a different material to ensure compatibility with the different fibres materials. In one example, the filaments comprise a stiffness modulus of approximately 320 (GPa). The carbon fibre filaments are embedded within a matrix, with a volume fraction of approximately 65%. The matrix typically has an elastic modulus of approximately 8 GPa. This gives an overall elastic modulus for the carbon fibre composite layer of approximately 213 GPa. Consequently, the filaments of the outer layer have a modulus of elasticity approximately 3 to 4 times higher than the filaments of the inner layer. In other embodiments, the filaments of the inner layer may a stiffness closer to that of the outer layer. The ratio of outer layer fibre stiffness to inner fibre layer stiffness may be in the range of 2:1 to 40:1.

Figure 5:
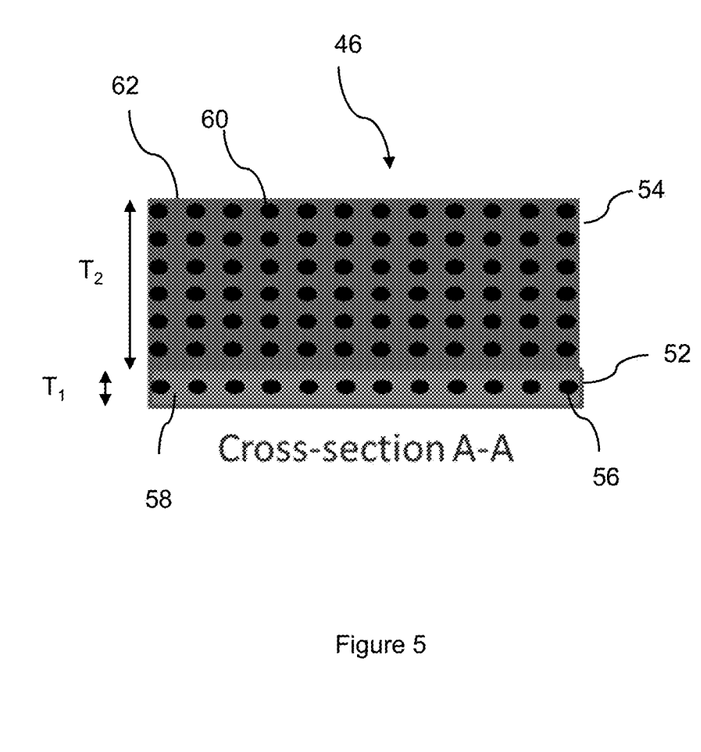
FIG. 5 is a cross sectional along the line A-A of FIG. 4.

Though the drawings are not shown to scale, particular dimensions are illustrated in FIGS. 4 and 5. The thickness $T_1$ of the inner layer in the radial direction is approximately 0.5 mm, and more generally is between 0.1 and 1 mm. On the other hand, the thickness $T_2$ of the outer layer is generally between 3 and 15 mm, depending on the required strength and stiffness of the sleeve 46.

Figure 6:
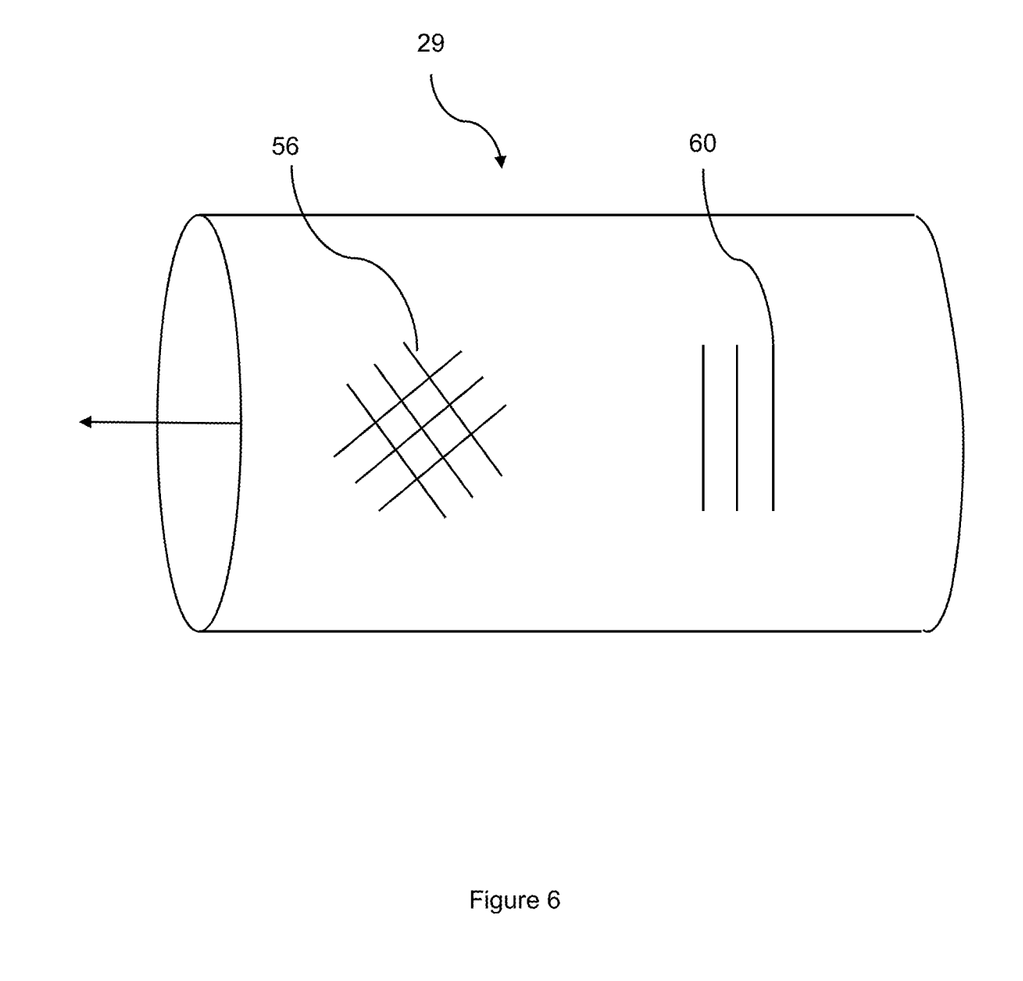
FIG. 6 is a diagram illustrating the ply directions of the rotor sleeve of FIG. 4.

Typically, in order to optimise the properties of the inner and outer layers 52, 54 the filaments 56, 60 are arranged in plies, such that they are wound in predetermined directions. The plies of the first layer 52 are provided as a plurality of sublayers, with the plies of each sub-layer being angled relative to a neighbouring layer. This ensures interlocking of the sub-layers, and enhances the multi-directional strength of the inner layer 52. The filaments 56 of the inner layer 52 are arranged approximately ±45° relative to the rotational axis X of the rotor 29 (i.e. filaments 56 lie approximately +45° angles and −45° angles). In some cases, rather than distinct sublayers, the plies of the first layer 52 may be interwoven, with filaments provided at alternating ±45° angles. In some cases, the filaments may be provided at between ±30° and ±60°. The filaments 60 of the outer layer 54 are arranged 90° to the rotational axis X for reasons that will be explained below.

The filaments 56, 60 of both the inner and outer layers 52, 54 are subject to a pre-stress during layup and, which is held in place once the composite structure is cured, or the pre-stress may be applied after curing. Typically, the pre-stress is between 500 and 1500 Mega Pascals (MPa), and in one embodiment tested by the inventors, is approximately 1,100 MPA. Such a high pre-stress ensures a radial compressive load on the rotor magnets in order to secure their contact with the rotor in response to centrifugal forces in operational use, and is higher than can typically be achieved in the prior art. This contributes to a reduction in overall thickness of the sleeve 46 compared to prior art composite or metallic sleeves.

Several methods may be used for construction of the sleeve. One method is to apply the filaments 56, 60 directly to the permanent magnets 44, while applying tension to the filaments. The filaments could be pre-impregnated with matrix material (e.g. resin), or applied as sheets. Once applied, the composite material is then cured. In either case, the filaments 56 of the first layer 52 will be applied first until the required thickness is built up, followed by the second layer 54.

However, a problem with this process is that the matrix material typically requires a high temperature to cure. On the other hand, if the curing process must be undertaken at a temperature below the Curie temperature of the permanent magnets 44, otherwise magnetisation of the magnets will be lost. Consequently, the sleeve must be built up slowly and cured in multiple stages, resulting in a time consuming and slow process. This method also tends to lead to reduced pre-stress, since the pre-stress decreases during the curing step. The pre-stress using this installation method has been found to be limited to around 500-800 MPa in practice.

Figure 7:
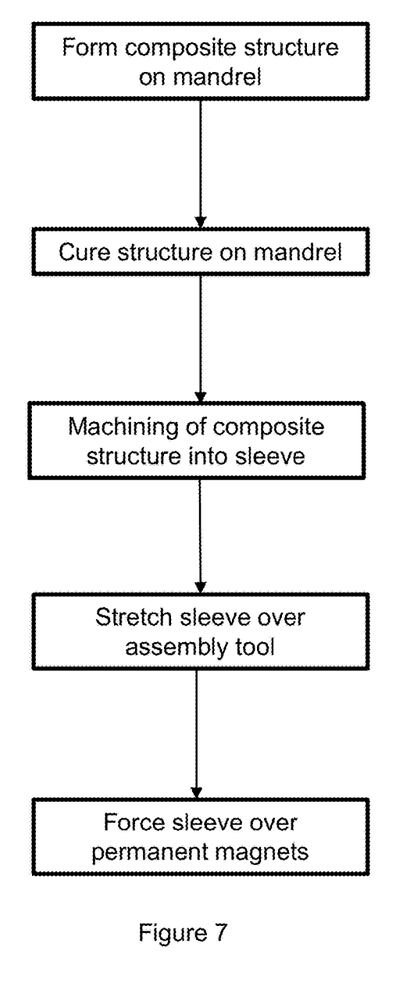
FIG. 7 is a flow diagram illustrating a method of manufacturing the electric machine rotor of FIG. 3.

A second method is illustrating in FIG. 7, which utilises an apparatus shown in FIG. 7. In a first step, the filaments 56, 60 are wrapped around a separate mandrel (not shown), and cured. This may be conducted using pre-impregnated fibres that are directly placed on the mandrel or dry fibres that are drawn through a resin bath and then placed on a mandrel in what is known as a wet filament winding process.

In a second step, the structure is cured on the mandrel. Since the mandrel does not need to maintain magnetisation, the curing process can take place at a higher temperature.

Figure 8:
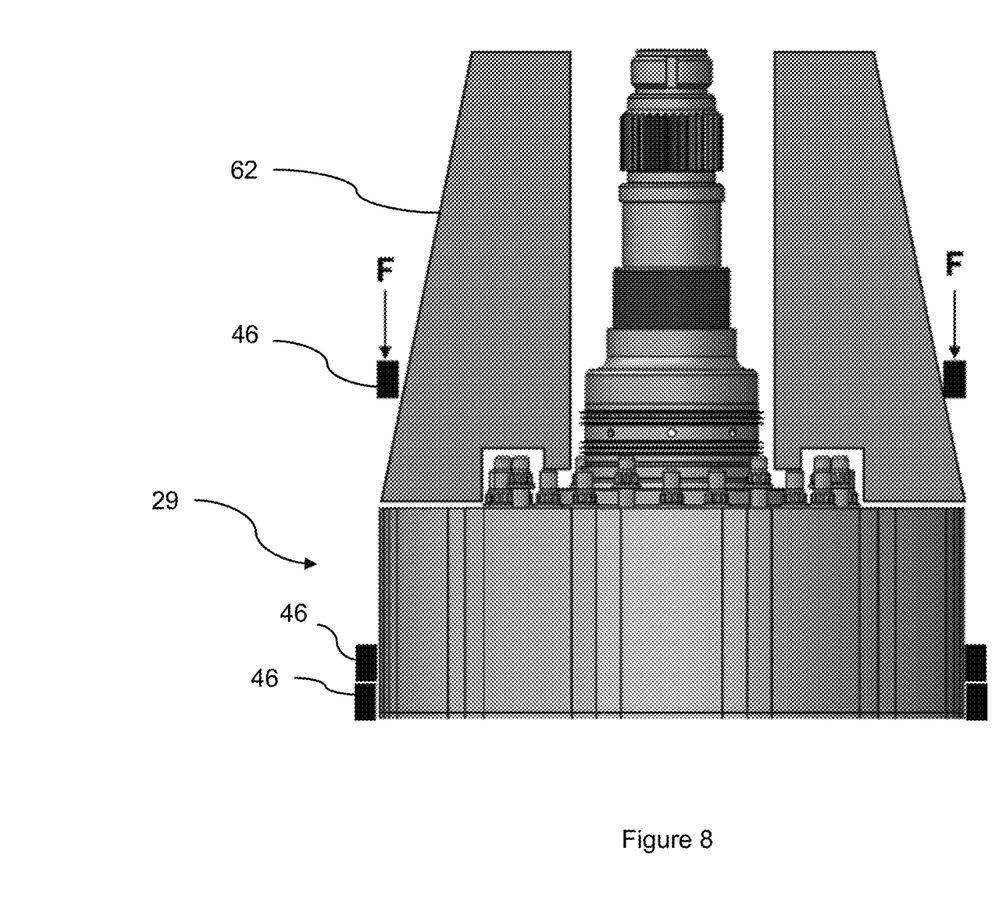
FIG. 8 is a cross-sectional side view of an assembly apparatus for carrying out the method of FIG. 7.

In a third step, the sleeve is optionally cut into smaller rings, and forced over a conical assembly tool 64, shown in FIG. 8. The assembly tool 64 has an outside diameter which tapers outwardly from a smaller diameter to a larger diameter which matches or slightly exceeds the outer diameter of the permanent magnets 46 of the rotor 29. By forcing the sleeve 46 over the mandrel, a pre-tension is applied, which increases the radially inward force applied by the sleeve 46 to the permanent magnets 44 when installed.

In a fourth step, the sleeve 46 is forced onto the permanent magnets 44, until the sleeve 46 is fully installed in the desired position. At this point, the sleeve 46 is fully installed on the rotor 29, with an interference fit.

This installation method with high level of pre-stress has previously been tried by the inventors with conventional composite sleeves, but has been unsuccessful. In those cases, the composite sleeve was damaged by the installation process, leading to breakage of the fibres. By providing an inner layer 52 having a lower modulus of elasticity, the high modulus fibres are protected from mechanical damage during the press-fitting process, and so the sleeve can be more readily stretched over the assembly tool, without damaging the fibres of the second layer 54.

The disclosed sleeve and assembly method has been found by the inventors to provide a rotor sleeve having increased strength and reduced thickness relative to prior arrangements, in view of the increased pre-tension that can be applied. In one example, the radial thickness of the sleeve was reduced from 10.2 mm to 8.4 mm. It will be appreciated that, as well as resulting in a direct reduction in weight, the reduced thickness also reduces the effective size of the airgap between the rotor 29 and stator 50. This in turn increases the transmission of torque between the rotor and stator, and so increases power density. In one electric machine to which the sleeve has been applied by the inventors, this has resulted in an overall weight reduction of 77 kg for a 2.5 megawatt (MV) electric machine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The electric machine may be used for other applications. For example, the electric machine may be utilised as a starter/generator for a gas turbine engine.

Alternatively, the electric machine may be used as either a generator or a motor in any other suitable application, such as an electric airliner that does not include a gas turbine engine.

The invention claimed is:

1. A rotor for an electric machine comprising:
a surface mount permanent magnet rotor; and
a rotor sleeve, the rotor sleeve comprising:
  filaments in a matrix material;
  an inner layer comprising one or more of glass, aramid, Polybenzoxazole, nylon and Dynema fiber wound filaments oriented at between ±30° and ±60° to an axis of the rotor, the filaments of the inner layer having a first tensile modulus of elasticity; and
  an outer layer of wound carbon fiber filaments wound at approximately 90° to the axis of the rotor around the inner layer, the filaments of the outer layer having a second tensile modulus of elasticity higher than the first modulus of elasticity.

2. The rotor according to claim 1, wherein the inner and/or the outer layer comprise pre-stressed filaments.

3. The rotor according to claim 1, wherein the outer layer of wound filaments is pre-stressed to a stress of greater than 1000 MPA.

4. The rotor according to claim 1, wherein the inner and/or the outer layer are within the matrix material and the matrix material comprises one or more of epoxy, cyanate ester or phenolic resin.

5. The rotor according to claim 1, wherein the inner layer comprises E-glass, S-glass, or a mixture of one of more of E-glass and S-glass.

6. The rotor according to claim 1, wherein the inner layer comprises alternating ply angles of approximately +45° and −45° relative to a rotational axis of the electric machine rotor when installed.

7. The rotor according to claim 1, wherein the inner layer has a radial thickness of between 0.1 and 1 mm.

8. An electric machine comprising the rotor according claim 1.

9. The electric machine according to claim 8, wherein the electric machine is configured to operate as one or both of a generator and a motor.

10. An aircraft propulsion system comprising the electric machine according to claim 8.

11. The rotor sleeve according to claim 1, wherein the outer layer of wound filaments is pre-stressed between 500 and 1500 MPA.

12. The rotor sleeve according to claim 1, wherein the inner layer has a radial thickness of approximately 0.5 mm.

13. A method of manufacturing a sleeved rotor of an electric machine, the method comprising:
providing a surface mount permanent magnet rotor;
providing a rotor sleeve comprising
filaments in a matrix material,
a first layer comprising one or more of glass, aramid, Polybenzoxazole, nylon and Dynema fiber wound filaments oriented at between ±30° and ±60° to an axis of the rotor, the filaments of the first layer having a first tensile modulus of elasticity, and
a second layer of wound carbon fiber filaments wound at approximately 90° to the axis of the rotor around an outer diameter of the first layer and having a second tensile modulus of elasticity higher than the first modulus of elasticity; and
sliding the sleeve over an outer diameter of the rotor.

14. The method according to claim 13, wherein the rotor comprises one or more permanent magnets, and further comprising sliding the sleeve over the outer diameter over the one or more permanent magnets.

15. The method according to claim 13, wherein the method comprises, in a first step, winding the first layer and the second layer around a mandrel, followed by curing of the first layer and the second layer to form a composite ring.

16. The method according to claim 15, wherein the method comprises, in a second step subsequent to the first step, urging the cured ring over a conical stressing device to increase an inner diameter of the ring and produce a pre-stress on the ring, and sliding the sleeve over the outer diameter of the rotor.

* * * * *